US 9,739,285 B2

(12) United States Patent
Kosmicki et al.

(10) Patent No.: US 9,739,285 B2
(45) Date of Patent: Aug. 22, 2017

(54) SEAL FOR A CENTRIFUGAL PUMP

(71) Applicant: Weir Slurry Group, Inc., Madison, WI (US)

(72) Inventors: Randy J. Kosmicki, Edgerton, WI (US); Michael L. Viken, Cottage Grove, WI (US)

(73) Assignee: Weir Slurry Group, Inc., Madison, WI (US)

( * ) Notice: Subject to any disclaimer, the term of this patent is extended or adjusted under 35 U.S.C. 154(b) by 720 days.

(21) Appl. No.: 14/211,756

(22) Filed: Mar. 14, 2014

(65) Prior Publication Data
US 2014/0271177 A1    Sep. 18, 2014

Related U.S. Application Data

(60) Provisional application No. 61/799,048, filed on Mar. 15, 2013.

(51) Int. Cl.
*F04D 29/42* (2006.01)
*F04D 29/62* (2006.01)
(Continued)

(52) U.S. Cl.
CPC ....... *F04D 29/4286* (2013.01); *F04D 29/086* (2013.01); *F04D 29/426* (2013.01); *F04D 29/622* (2013.01); *F04D 29/628* (2013.01); *F16J 15/061* (2013.01); *F16J 15/062* (2013.01); *F16J 15/106* (2013.01); *Y10T 29/49243* (2015.01)

(58) Field of Classification Search
CPC .. F04D 29/4286; F04D 29/628; F04D 29/622; F04D 29/426; F04D 29/167; F04D 29/086; F16J 15/3268
See application file for complete search history.

(56) References Cited

U.S. PATENT DOCUMENTS

| 2,365,058 A | 12/1944 | Crawford |
| 4,243,233 A | 1/1981 | Arai |

(Continued)

FOREIGN PATENT DOCUMENTS

| DE | 102010034033 A1 | 2/2012 |
| EP | 1566548 A2 | 8/2005 |

(Continued)

OTHER PUBLICATIONS

International Preliminary Report on Patentability mailed Mar. 26, 2015 in corresponding PCT Application PCT/US14/28583; 5 pages.

(Continued)

*Primary Examiner* — Justin Seabe
(74) *Attorney, Agent, or Firm* — Gardere Wynne Sewell LLP

(57) ABSTRACT

A seal for use in a centrifugal pump, the pump having a stationary pump casing, a stationary plate and an axially adjustable side liner, is disclosed. The seal includes a base having an inner surface and an outer surface. A band portion extends from the base and a retainer member extends from the band portion. The retainer member is spaced apart from the base and oriented for positioning against a groove formed in the axially adjustable side plate liner of the centrifugal pump.

33 Claims, 6 Drawing Sheets

(51) Int. Cl.
*F04D 29/08* (2006.01)
*F16J 15/06* (2006.01)
*F16J 15/10* (2006.01)

(56) References Cited

U.S. PATENT DOCUMENTS

| | | | |
|---|---|---|---|
| 4,703,939 A * | 11/1987 | Wentworth | F04D 29/126 |
| | | | 277/372 |
| 4,850,601 A | 7/1989 | Maier et al. | |
| 5,029,878 A | 7/1991 | Ray | |
| 5,071,318 A | 12/1991 | Bice et al. | |
| 5,295,786 A | 3/1994 | Kajiwara | |
| 5,306,021 A | 4/1994 | Morvant | |
| 5,346,662 A | 9/1994 | Black et al. | |
| 5,513,954 A | 5/1996 | Bourgeois | |
| 5,772,217 A | 6/1998 | Poll | |
| 5,921,748 A | 7/1999 | Frater | |
| 5,941,536 A | 8/1999 | Hill | |
| 5,971,704 A | 10/1999 | Blattmann | |
| 5,984,316 A | 11/1999 | Balsells | |
| 6,189,894 B1 | 2/2001 | Wheeler | |
| 7,416,383 B2 | 8/2008 | Burgess | |
| 7,429,160 B2 | 9/2008 | Roudnev et al. | |
| 7,476,075 B2 | 1/2009 | Geldenhuys | |
| 7,823,887 B2 * | 11/2010 | Geldenhuys | F04D 29/086 |
| | | | 277/611 |
| 2007/0158917 A1 | 7/2007 | Paykin | |
| 2011/0142599 A1 | 6/2011 | Burgess et al. | |
| 2013/0028706 A1 | 1/2013 | Paddock et al. | |

FOREIGN PATENT DOCUMENTS

| | | |
|---|---|---|
| GB | 906958 A | 9/1962 |
| GB | 2212869 A | 8/1989 |
| GB | 2266749 A | 11/1993 |

OTHER PUBLICATIONS

International Search Report and Written Opinion in International Application No. PCT/US2014/028583 dated Aug. 1, 2014 (10 pages).

Supplementary European Search Report for European Patent Application No. EP14763439 dated Oct. 14, 2016; 8 pages.

Canadian Office Action dated Apr. 4, 2017, issued by CIPO, re App No. 2,906,777, 3 pages.

* cited by examiner

SEAL FOR A CENTRIFUGAL PUMP

CROSS-REFERENCE TO RELATED APPLICATIONS

This application claims priority to U.S. Provisional Patent Application No. 61/799,048 filed on Mar. 15, 2013, which is incorporated herein by reference in its entirety.

TECHNICAL FIELD

This disclosure relates in general to centrifugal pumps for industrial use, and in particular, to a seal for use in centrifugal pumps having axially adjustable side liners.

BACKGROUND OF THE DISCLOSURE

Centrifugal pumps are used in many industrial applications to process and transport fluids. When the fluids contain particulate matter, such as in the mining industry, slurry pumps, a type of centrifugal pump, are oftentimes used. Slurry pumps are particularly constructed and configured to withstand the damage that can be caused to the pump by processing the abrasive particulates and solids of which slurries are partially comprised.

When abrasive slurries are processed by centrifugal pumps, the fluid tends to migrate between the impeller and the casing. As a result, the inner surface of the casing (i.e., the portion of the casing that is located adjacent the impeller) and the impeller become worn and gaps are formed of ever-increasing width, between the impeller and the inner surface of the casing. This oftentimes results in a decrease in pump efficiency.

Slurry pumps vary in design. In a non-limiting, exemplary embodiment, a slurry pump is constructed to include one or more adjustable side liners arranged to lessen or otherwise minimize the gaps formed between the inner surface of the casing and the impeller. Minimizing these gaps improves pumping efficiencies, thus, many slurry pump designs employ one or more axially adjustable side plate liners to enable the adjustable side plate liner to be brought into closer proximity to the impeller as the inner surface of the side plate liner and/or the impeller wear. The use of side liners in a centrifugal slurry pump is previously disclosed in, for example, U.S. Pat. No. 5,513,954 and U.S. Pat. No. 5,941,536, the disclosures of which are incorporated herein by reference in their entirety. However, as the adjustable side plate liners are moved, it become increasingly difficult to maintain a fluid seal between the casing elements.

SUMMARY

In a first aspect there is provided a seal for a centrifugal pump having a stationary pump casing, a stationary plate and an axially adjustable side liner. The seal includes a base having an inner surface and an outer surface and a band portion extending from the base. The seal further includes a retainer member extending from the band portion and spaced apart from the base. The retainer member is oriented for positioning in and/or against a groove formed in the axially adjustable side plate liner of the centrifugal pump.

In certain embodiments, the seal includes a lip positioned proximate the outer surface of the base for positioning against and/or in a groove formed in the stationary pump casing.

In other certain embodiments, the base further includes an extension member axially extending from the inner surface of the base, which defines a groove between the base and the retainer member.

In yet another embodiment, a rib extends from the band portion in a direction opposite the retainer member and is oriented for positioning against the stationary pump casing.

In still another embodiment, a reinforcing element is positioned along the band portion.

In yet another embodiment, the reinforcing element is a non-elastic material.

In other certain embodiments, the band portion is an elastomer.

In certain embodiments, the band portion includes a plurality of arcuate members embedded in the band portion.

In yet another embodiment, the reinforcing element is radially aligned with a rib that is formed in the band portion of the seal.

In a second aspect, there is provided a centrifugal pump having a volute casing, a suction plate attached to the volute casing and being configured with a suction inlet. The pump also includes a frame plate attached to the volute casing and is positioned parallel to and spaced apart from the suction plate. An axially adjustable suction plate liner is positioned adjacent to and adjustably attached to the suction plate, and an axially adjustable frame plate liner is positioned adjacent to and adjustably attached to the frame plate. At least one seal is positioned between the suction plate or the frame plate and the volute casing, and between the axially adjustable suction plate liner or the axially adjustable frame plate liner and the volute casing. The at least one seal includes a base positioned against one of either the suction plate or the frame plate, and the at least one seal includes a band portion extending from the base. The band portion includes a retainer member spaced apart from the base and is positioned in either a groove of the axially adjustable suction plate liner or a groove in the axially adjustable frame plate liner.

In certain embodiments, the at least one seal further includes a lip positioned against the volute casing.

In other certain embodiments, the lip of the at least one seal is positioned in a groove formed in the volute casing.

In yet another embodiment, the at least one seal further includes a groove formed between the base and the retainer member to receive a ridge formed in either the axially adjustable suction plate liner or the axially adjustable frame plate liner.

In still another embodiment, the at least one seal further includes a reinforcement element positioned along the band portion of the at least one seal.

In certain embodiments, the at least one seal further includes a rib extending from the band portion in a direction opposite the retainer member to contact the volute casing.

In other certain embodiments, the at least one seal is a first seal and a second seal. The first seal is positioned between the volute casing, the suction plate and the axially adjustable suction plate liner. The second seal is positioned between the volute casing, the frame plate and the axially adjustable frame plate liner.

In a third aspect, there is provided a method of assembling a centrifugal pump having a volute casing, a stationary plate, an axially adjustable plate liner and a seal. The seal includes a base, a band portion extending from the base and a retainer member extending from the band portion. The method includes positioning the retainer member into a groove formed in the axially adjustable plate liner. The method also includes positioning the band portion between the volute casing and the axially adjustable plate liner. Furthermore, the method includes positioning the stationary plate against the base whereby the base is disposed between the stationary plate and at least the volute casing. The method also includes securing the stationary plate to the volute casing and the axially adjustable plate liner.

In certain embodiments, the ridge is formed on the axially adjustable plate liner and a groove is formed between the base and the retainer member of the seal. The method further includes the step of positioning the groove over the ridge.

In a fourth aspect, there is provided a method of adjusting an axially adjustable side plate liner used in a centrifugal pump. The pump includes a seal, a volute casing, a stationary plate and an axially adjustable side plate liner. The seal includes a base, a band portion extending from the base and a retainer member extending from the band portion spaced apart from the base. The retainer member is disposed in a groove formed in the axially adjustable side plate liner and the band portion is disposed between the volute casing and the axially adjustable side plate liner. The base is disposed between the stationary plate and at least the volute casing. The method includes engaging a driving member to move the axially adjustable side plate liner in an axial direction relative to the stationary plate while the stationary plate maintains a fixed position.

In certain embodiments, the seal deforms as the axially adjustable side plate liner is moved axially relative to the stationary plate to maintain a fluid seal between the volute casing and the axially adjustable side plate liner.

In other certain embodiments, the retainer member engages the groove when the axially adjustable side plate liner is moved in an axial direction relative to the stationary plate, causing the seal to deform to maintain a fluid seal between the volute casing and the axially adjustable side plate liner.

In still other embodiments, the seal further includes a rib extending from between the band portion opposite the retainer member. The retainer member engages the groove when the axially adjustable side plate liner is moved in an axial direction relative to the stationary plate, which causes the rib to compress against the volute casing to maintain a fluid seal between the volute casing and the axially adjustable side plate liner.

In yet another embodiment, the seal further includes a lip positioned proximate an outer surface of the base and extending axially from the base, the lip being retained in a recess formed in the volute casing when the axially adjustable side plate liner is moved in an axial direction relative to the stationary plate to maintain a fluid seal between the volute casing and the stationary plate.

In a fifth aspect, a volute casing is presented for use in a centrifugal pump, where the centrifugal pump includes a stationary plate, an axially adjustable side liner and a seal having a lip. The volute casing comprises a groove for receiving the lip of the seal therein when the volute casing is oriented toward the stationary plate and the seal is positioned between the volute casing and the stationary plate.

In certain embodiments, the groove engages and retains the lip when the seal is deformed due to movement of the axially adjustable side liner.

In other certain embodiments, the groove extends circumferentially around an outer periphery of the volute casing.

In a sixth aspect, an axially adjustable side liner is presented for use in a centrifugal pump, where the centrifugal pump has a stationary plate, a volute casing and a seal having a retainer member. The axially adjustable side liner comprises a groove for receiving the retainer member therein when the axially adjustable side liner is positioned adjacent the volute casing and the seal is disposed between the axially adjustable side liner and the volute casing.

In certain embodiments, a ridge is formed in the axially adjustable side liner adjacent the groove for receiving a groove formed in the seal.

In other certain embodiments, the ridge extends circumferentially around and radially outward from an outer annular surface of the side liner.

In still other embodiments, a shoulder is formed circumferentially around an outer annular surface of the side liner.

In yet another embodiment, the shoulder is formed in the axially adjustable side liner for receiving a complementary portion of the seal.

In certain embodiments, the groove engages and retains the retainer member when the seal is deformed due to movement of the axially adjustable side liner.

In other certain embodiments, the groove extends circumferentially around an annular surface of the side liner.

Other aspects, features, and advantages will become apparent from the following detailed description when taken in conjunction with the accompanying drawings, which are a part of this disclosure and which illustrate, by way of example, principles of the various aspects and embodiments disclosed.

DESCRIPTION OF THE FIGURES

The accompanying drawings facilitate an understanding of the various embodiments.

DETAILED DESCRIPTION

Figure 1:
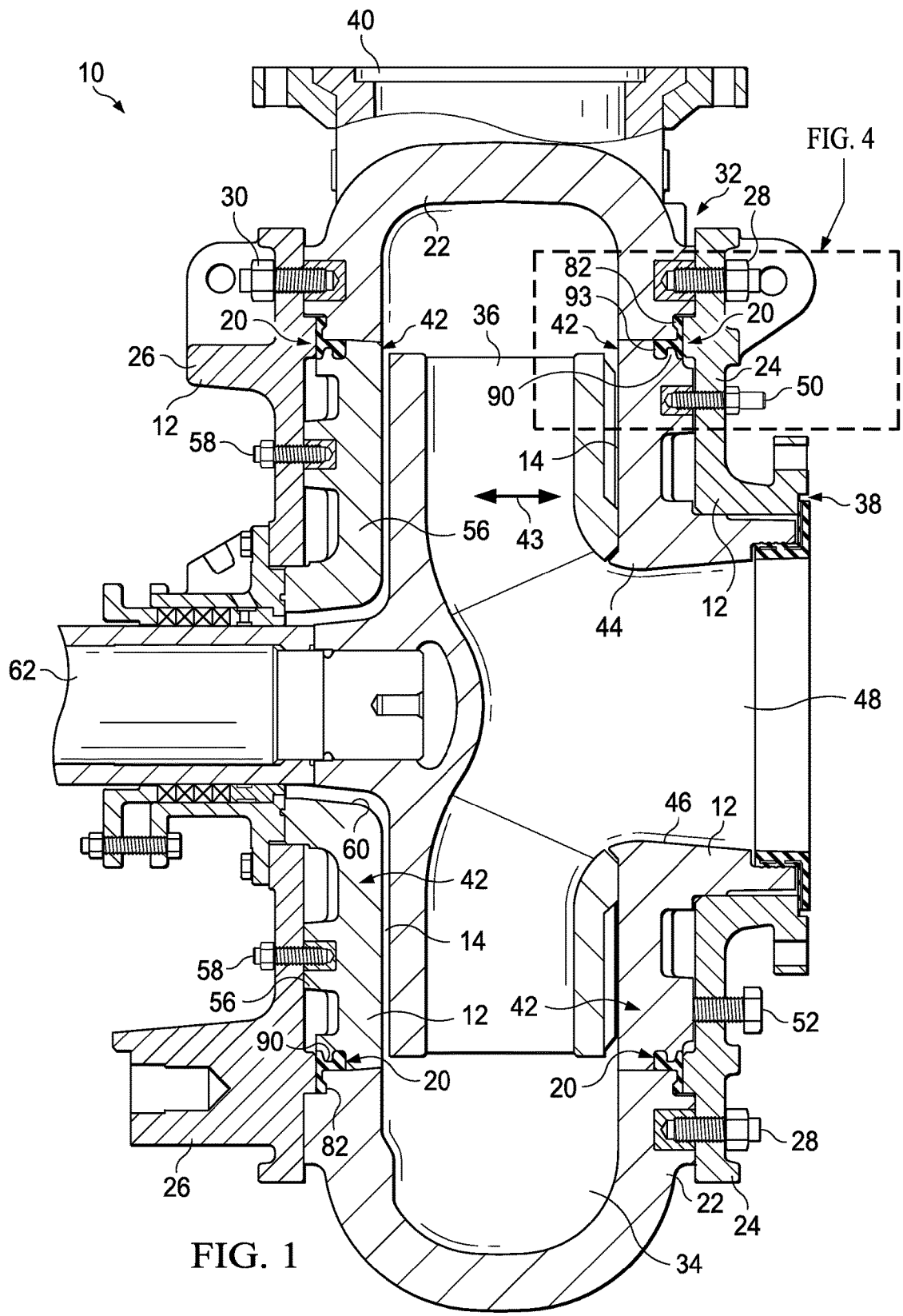
FIG. 1 is cross-sectional view of an illustrative embodiment of centrifugal pump having an adjustable side liner and a seal positioned proximate the adjustable side liner.

Referring to FIG. 1, a centrifugal pump 10 for use in processing slurries is illustrated in which a seal 20 is employed, as explained in further detail below, to provide a fluid seal during operation of the pump 10. In the embodiment illustrated in FIG. 1, the centrifugal pump 10 includes a volute or stationary pump casing 22, a suction plate 24 and a frame plate 26. For purposes of discussion herein, the suction plate 24 and the frame plate 26 are also interchangeably referred to as stationary plates 12. In FIG. 1, the suction plate 24 is secured to the volute casing 22 by fasteners 28, such as bolts. Likewise, the frame plate 26 is attached to the volute casing 22 by fasteners 30, such as bolts.

Generally, the volute casing 22, the suction plate 24 and the frame plate 26 define a pump casing 32 of the centrifugal pump 10 and, in particular, a pump chamber 34 in which an impeller 36 is positioned. The suction plate 24 includes a central suction opening 38 and the volute casing 22 includes a discharge outlet 40 through which the pumped fluid exits the centrifugal pump 10.

In the embodiment illustrated in FIG. 1, the centrifugal pump 10 further includes an axially adjustable side plate liner 42 that is movable toward and away from the impeller 36 in the direction of arrow 43 in order to minimize and/or otherwise reduce the space or gap 14 between the impeller 35 and the side plate liner 42 to maintain efficient pump operation. As used herein, the term "adjustable side plate liner 42" refers to an axially adjustable suction plate liner or throatbush 44 and an axially adjustable frame plate liner 56, either collectively or individually.

The axially adjustable suction plate liner 44 is configured with a central opening 46 that defines a suction inlet 48 through which fluid enters into the centrifugal pump 10 toward the impeller 36. The axially adjustable suction plate liner 44 is positioned adjacent, and adjustably attached to, the suction plate 24 by a plurality of fasteners 50, such as a plurality of threaded screws. The axially adjustable suction plate liner 44 is adjustable relative to the stationary suction plate 24 by, for example, loosening the plurality of fasteners 50, then turning one or more driving members 52, such as push bolts, which are threadingly received through the suction plate 24. In operation, the driving members 52 push the axially adjustable suction plate liner 44 toward the impeller 36 until the desired clearance is achieved, at which point the plurality of fasteners 50 are re-tightened to secure and otherwise maintain the position of the axially adjustable suction plate liner 44 relative to the suction plate 24 and the impeller 36.

The axially adjustable frame plate liner 56 is formed with a central opening 60 through which a drive shaft 62 extends for securement to the impeller 36. The axially adjustable frame plate liner 56 is positioned adjacent, and adjustably attached to, the frame plate 26 by a plurality of fasteners 58, such as screws. The axially adjustable frame plate liner 56 is axially adjustable relative to the frame plate 26 in the same manner as previously described with regard to the axial adjustment of the axially adjustable suction plate liner 44 relative to the suction plate 24, i.e., by means of fasteners and driving members.

Having thus described the illustrated structure of the centrifugal pump 10, it should be noted that the illustrated construction of FIG. 1 is by way of example only, and the configuration of the pump casing elements 32 varies depending on factors such as pump size and the application for which the pump 10 is to be used. The illustrated centrifugal pump 10, however, demonstrates an exemplary assembly in which the seal 20 is disposed in the centrifugal pump 10 to provide a fluid seal during operation of the pump 10 while also accommodating the axial adjustments of the liners 42.

Generally, the seal 20 fluidly seals the pump casing elements, particularly with respect to (i) the axial adjustable side plate liner 42 relative to the stationary plates 12, (ii) the axial adjustable side plate liner 42 relative to the volute casing 22 and (iii) the stationary plates 12 relative to the volute casing 22. In operation, the seal 20 provides a fluid seal between the stationary and adjustable pump casing elements 12 and 42 as described herein, while being configured for improved manufacture and installment.

In the embodiment illustrated in FIG. 1, the seal 20 is sized and configured to be positioned between the stationary pump casing elements, namely the volute casing 22 and the suction plate 24 and/or frame plate 26, and the adjustable side plate liner 42, namely the axially adjustable suction plate liner 44 and/or the axially adjustable frame plate liner 56. In one embodiment, the seal 20 is annular and formed as a continuous ring or, in the alternative, is formed by a plurality of arcuate segments. In an illustrative embodiment, the seal 20 is formed, at least partially, of an elastomeric material.

Figure 2:
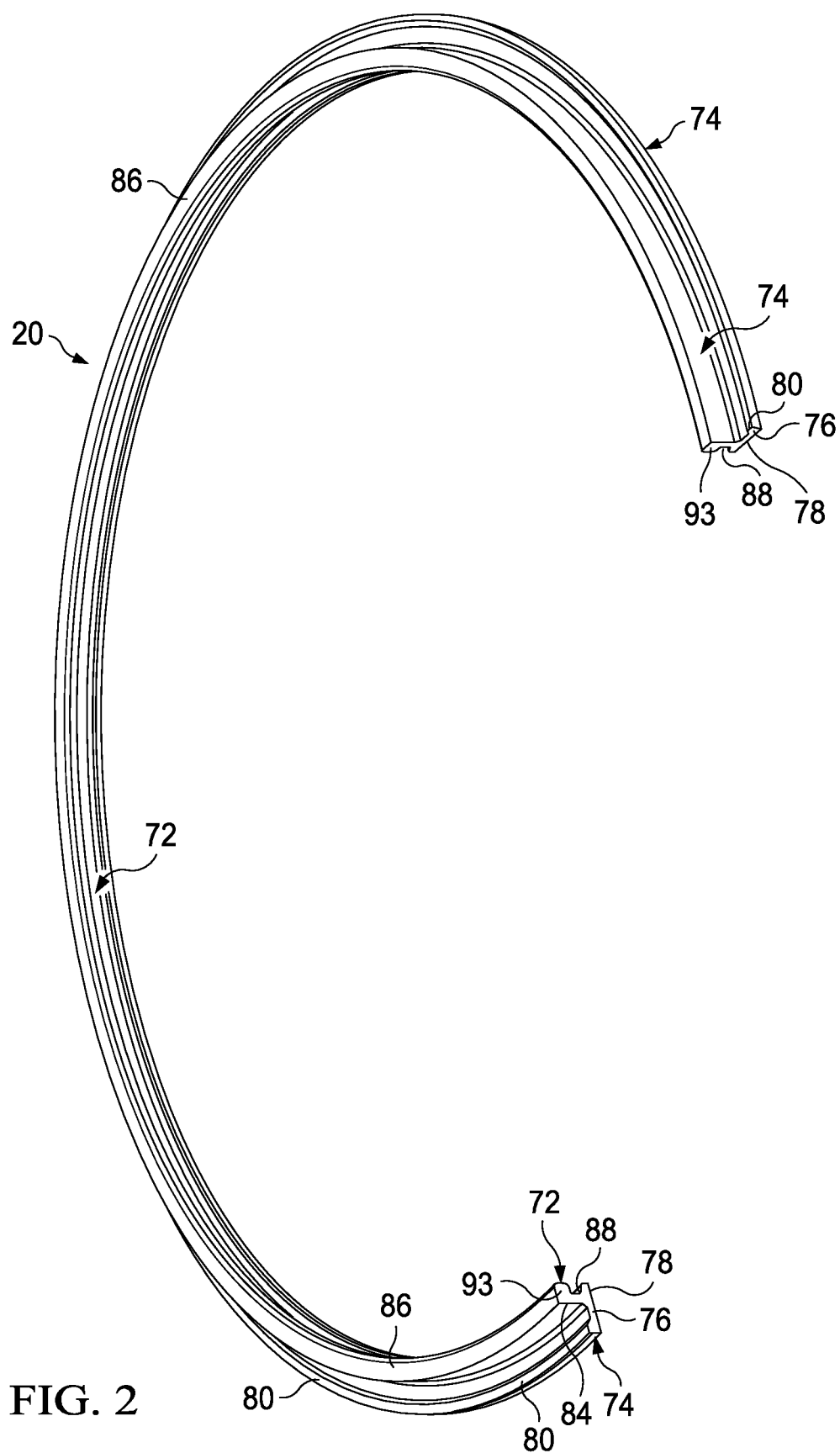
FIG. 2 is a perspective view depicting a portion of the seal illustrated in FIG. 1.
Figure 3:
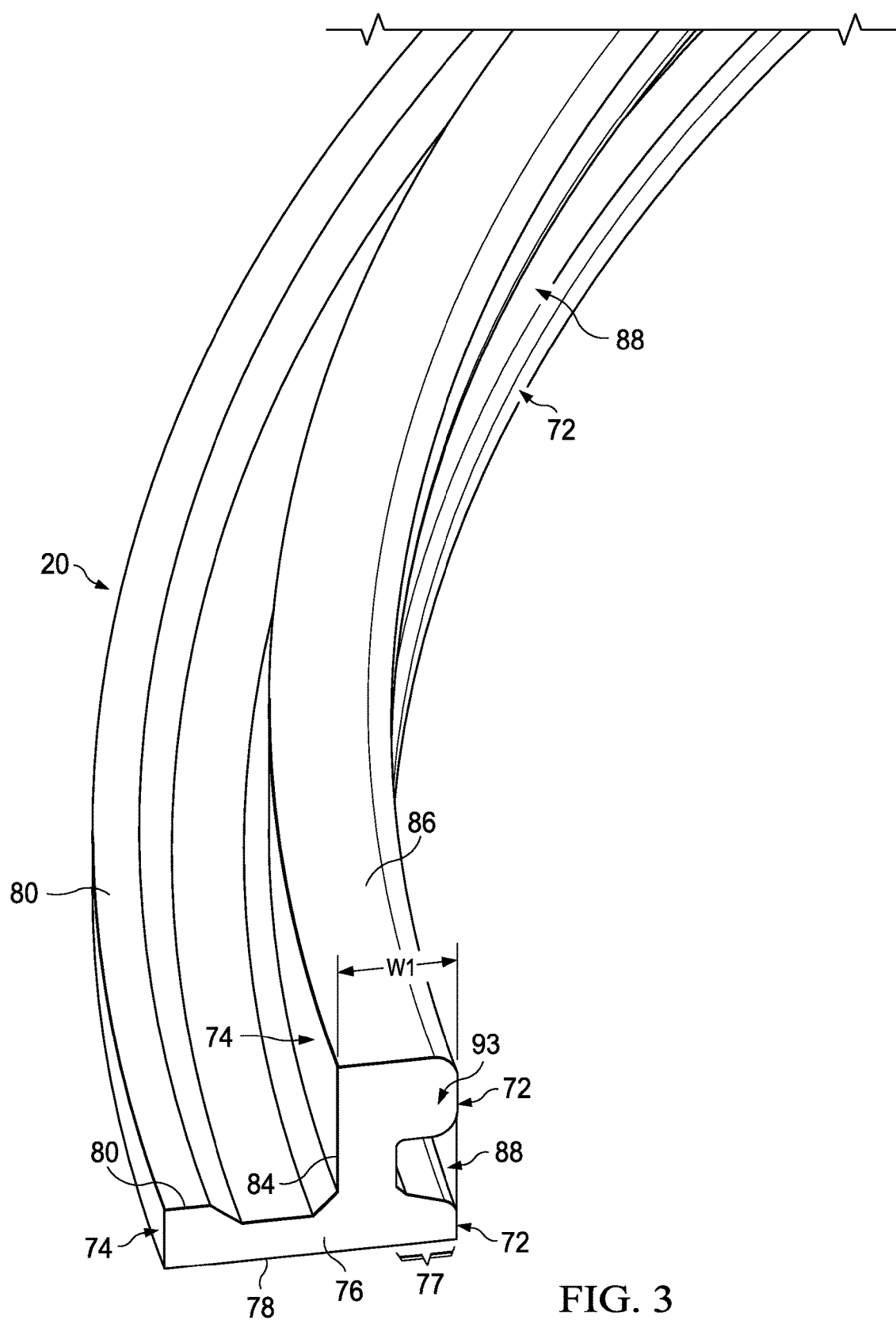
FIG. 3 is an enlarged view of a portion of the seal illustrated in FIG. 2.
Figure 4:
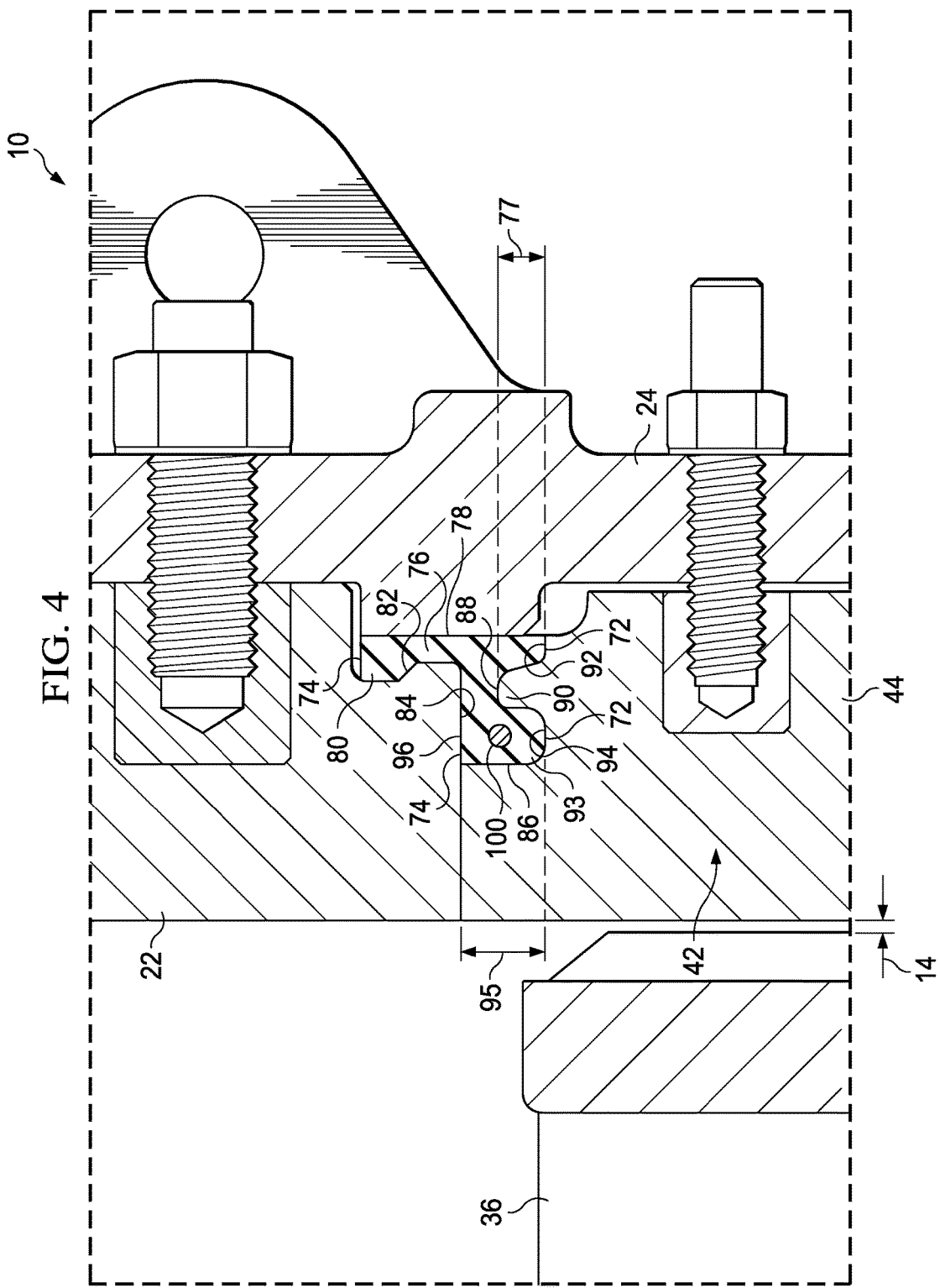
FIG. 4 is a detail view of a portion of the centrifugal pump illustrated in FIG. 1 illustrating the seal positioned proximate the adjustable side liner.

Referring specifically to FIGS. 2 and 3, the seal 20 includes a base section 76 having an inner surface 72 and an outer surface 74. The base section 76 further includes a radial surface 78 oriented for positioning against a stationary pump casing element, namely either the suction plate 24 or the frame plate 26, as illustrated, for example, in FIG. 1. The seal 20 further includes a lip 80 that is positioned proximate the outer surface 74 of the seal 20 and extends outward from the base 76 in a direction opposite or away from the radial surface 78. As illustrated in FIG. 4, the lip 80 is oriented and otherwise configured to contact the volute casing 22.

Referring specifically to FIGS. 1 and 4, the pump 10 includes a ridge 90, a shoulder 92 and a groove 94 formed on the axially adjustable side plate liner 42, and further, the volute casing includes a groove 82. In one embodiment, the groove 82 extends circumferentially around an outer periphery of the volute casing 22, which faces the stationary plate 12 during operation. An embodiment provides that the groove 94 extends circumferentially around an annular surface of the axially adjustable side plate liner 42, which faces the volute casing 22 during operation. As discussed in greater detail below, the ridge 90, the shoulder 92 and the grooves 82 and 94 are each sized and positioned to receive complimentary portions of the seal 20. In other embodiments, the grooves 82, 94 in the volute casing 22 or the side plate liner 42 may be in a complimentary shape including, but not limited to, a curved groove, chamfer, or bevel to receive portions of the seal 20. Notably, while FIG. 4 illustrates only the suction side of the centrifugal pump 10, it is understood that a similar configuration is formed in the volute casing 22 adjacent to the frame plate 26, as illustrated in FIG. 1.

In the embodiment illustrated in FIGS. 2 and 3, for example, the seal 20 further includes a band portion 84 extending from the base 76 with a retainer member 93 extending from the band portion 84. The retainer member 93 is configured and oriented for placement in the corresponding groove 94 of the adjustable side plate liner 42. According to some embodiments, the band portion 84 extends from the base 76 in a direction substantially similar as the lip 80 and is oriented generally perpendicular to the radial surface 78. In the embodiment illustrated in FIGS. 2 and 3, the band portion 84 is configured with a facet 86 that is spaced from and, in one example, oriented generally parallel to the radial surface 78 of the base 76. The facet 86 is oriented for positioning against the axially adjustable side plate liner 42 of the centrifugal pump 10, namely either the axially adjustable suction plate liner 44 or the axially adjustable frame plate liner 56.

According to some embodiments, the base 76 is further configured with an extension member 77 axially extending from and forming a part of the base 76 thereby forming a groove 88 between the extension member 77 and the retainer member 93. As illustrated in FIGS. 1 and 4, the ridge 90 formed in the adjustable side plate liner 42 is oriented to be inserted in the groove 88 of the seal 20. The ridge 90 extends circumferentially around and radially outward from an outer annular surface of the axially adjustable side plate liner 42, the annular surface facing the volute casing 22. In certain embodiments, the shoulder 92 is also formed circumferentially around the outer annular surface of the axially adjustable side plate liner 42.

In operation, the cooperative engagement of the ridge 90 formed on the adjustable side plate liner 42 and the groove 88 formed in the seal 20 ensures that the seal 20 will maintain a comprehensive or fluid seal between the volute casing 22 and the adjustable side plate liner 42 as the adjustable side plate liner 42 is axially adjusted in the direction of arrow 43 toward the impeller 36. The fluid seal is further facilitated by the retainer member 93 having a width, w1 (FIG. 3), which is generally defined or denoted by the width of the facet 86, the width w1 being greater than the space that exists between the volute casing 22 and the adjustable side plate liner 42.

Figure 4A:
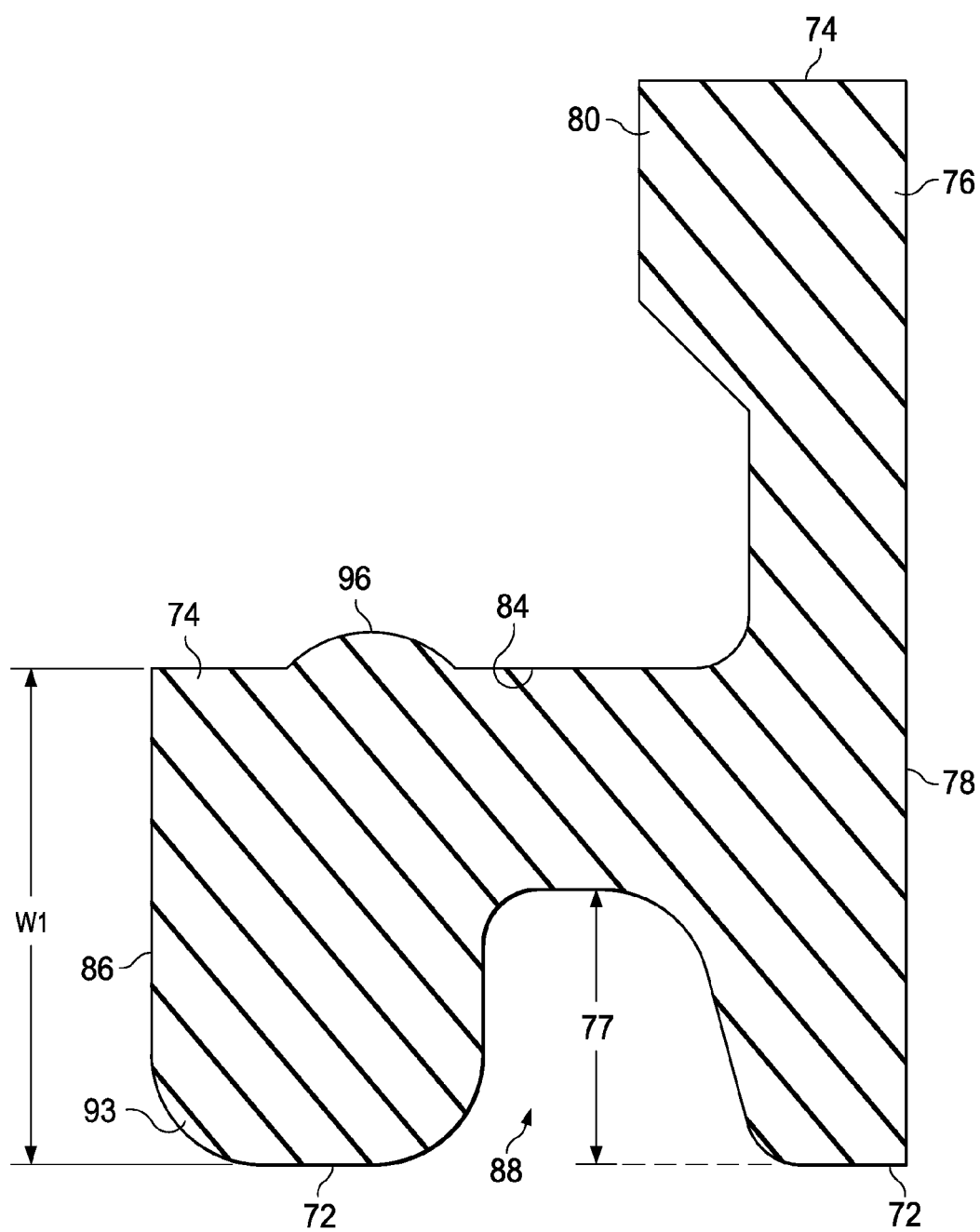
FIG. 4A is a detail view of the seal of FIG. 4.

In furtherance of maintaining the fluid seal between the stationary volute casing 22 and the adjustable side plate liner 42, the band portion 84 is optionally formed with an extension or rib 96, as best illustrated in FIG. 4A. As illustrated, the rib 96 extends from the band portion 84 in a direction opposite the retainer member 93 and is configured to engage and/or otherwise abut against the volute casing 22 to facilitate additional sealing between the stationary volute casing 22 and the axially adjustable side plate liner 42.

Figure 5:
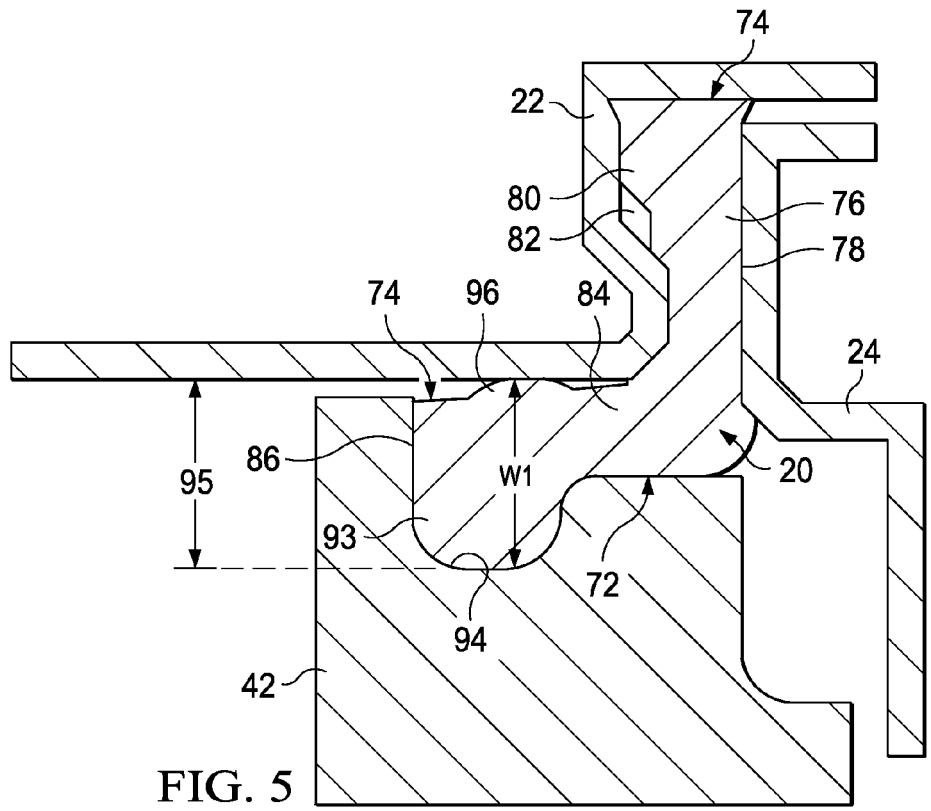
FIGS. 5 and 6 are illustrations of an alternate embodiment of the seal illustrated in FIGS. 1-4A, depicting the seal in a first or un-stretched position and a second or stretched position.
Figure 6:
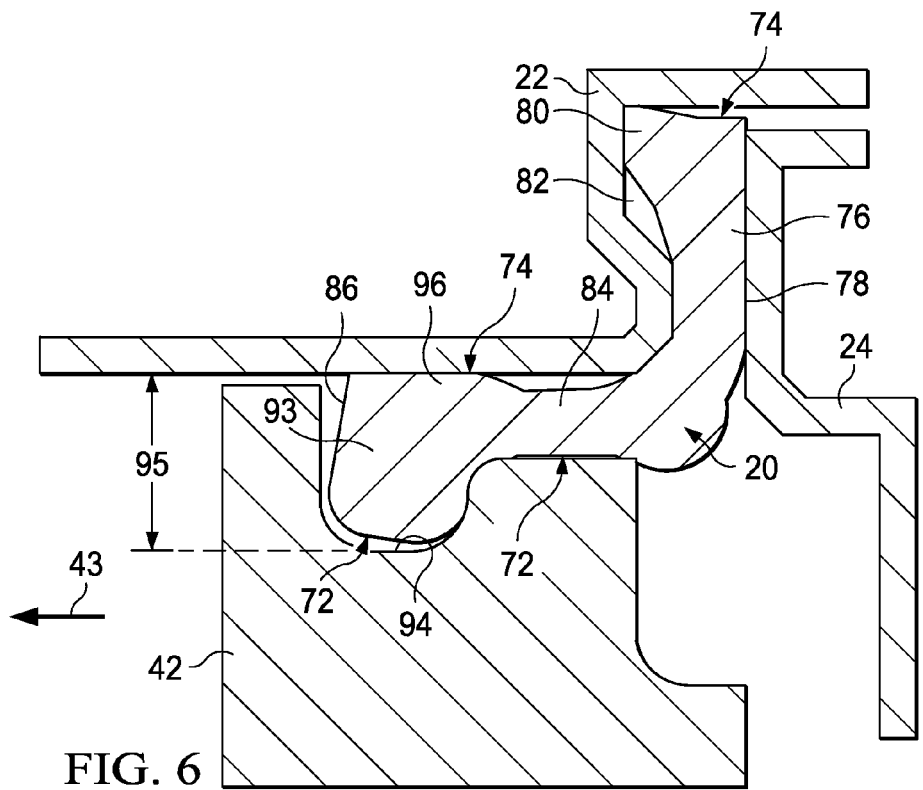

The efficacy of the seal 20 is generally illustrated in FIGS. 5 and 6, which illustrate the deformation of the seal 20 during the axial adjustment of the adjustable side plate liner 42 relative to the stationary plate 12. In FIG. 5, the seal 20 is depicted in position between the volute casing 22, the suction plate 24 and the axially adjustable suction plate liner 44 as initially installed and prior to axial adjustment of the suction plate liner 44 (i.e., in a first or un-deformed position). In FIG. 6, the axially adjustable suction plate liner 44 has been adjusted and/or otherwise axially positioned in the direction of arrow 43 (i.e., away from the stationary suction plate 24 and toward the impeller 36) thereby causing elastic deformation of the seal 20. In particular, during axial adjustment of the suction plate liner 44, the portion of the lip 80 and the retainer 93 within their respective grooves 82 and 94, anchors the seal 20 to facilitate the elastic deformation of the seal in general and the band portion 84, in particular (best illustrated in FIG. 6). Thus, the configuration of the seal 20 illustrated in FIG. 6 enables the seal 20 to effectively maintain a comprehensive sealing relationship between the stationary pump casing elements and the axially adjustable suction plate liner 44. It should be noted that the embodiment of the seal 20 illustrated in the modeling depictions of FIGS. 5 and 6 differs from the seal 20 illustrated in FIG. 4 by an absence of the extension 77 and, thus, the absence of the groove 88. It is to be understood, however, that the embodiment of the seal 20 depicted in FIG. 4 provides a comparable sealing performance. Likewise, it is to be understood that the embodiment of seal 20 depicted in FIGS. 1-3 (without rib 96) provides a comparable sealing performance.

In the embodiment illustrated in FIG. 4, the seal 20 optionally includes a reinforcing element 100 positioned along the band portion 84. According to some embodiments, the reinforcing element 100 is formed of a non-elastic material such as, for example, a metal or ceramic material. In one embodiment, the reinforcing element 100 is a continuous ring of non-elastic material that is positioned along and/or otherwise embedded in the band portion 84. In an alternative embodiment, the reinforcing element 100 is comprised of separate, arcuate reinforcing elements that are positioned along the band portion 84. In yet another aspect, the reinforcing element 100 may be embedded in the elastomeric material of the seal 20 and, further, be embedded in the retainer member 93 portion of the seal 20. The reinforcing element 100 adds additional rigidity to the seal 20 and helps maintain the position of seal 20 on and around the adjustable side plate liner 42. In particular, the reinforcing element 100 operates to maintain the band portion 84 in position on and about the adjustable side plate liner 42 as the adjustable side plate liner 42 is axially adjusted by providing an engagement of the reinforcing element 100 and the band portion 84 against the ridge 90 of the adjustable side plate liner 42. This enables the ridge 90 to be maintained in complementary relationship with the groove 88 of the seal 20. In another aspect, the reinforcing element 100 provides engagement against the groove 94 formed in the adjustable side plate liner 42, with or without the presence of the ridge 90 and/or shoulder 92. Or, stated otherwise, the reinforcing element 100 acts to maintain the seal 20 in position on and about the adjustable side plate liner 42.

In assembly of the centrifugal pump 10, the seal 20 is first positioned on and circumferentially about the shoulder 92 of the axially adjustable side plate liner 42, namely, the axially adjustable suction plate liner 44 or the axially adjustable frame plate liner 56. If so configured, the groove 88 of the seal 20 is positioned over and around the ridge 90 of the axially adjustable side plate liner 42 to initially position the seal 20 with respect to the axially adjustable side plate liner 42. In some embodiments, the seal 20 is made of a material that has a modulus of elasticity sufficient to allow the seal 20 to be circumferentially stretched by a small enough amount (in a non-limiting example, between about 5-10%) to enable installation of the seal by hand about the axially adjustable side plate liner 42 while still providing a tight engagement with the axially adjustable side plate liner 42 when the seal 20 returns to its initial shape and circumference.

The axially adjustable side plate liner 42 is then positioned adjacent the volute casing 22, as shown FIG. 1, and the lip 80 of the seal 20 is positioned to be, and is, received in the groove 82 of the volute casing 22. The stationary plates 12, namely the suction plate 24 and/or frame plate 26, are then positioned adjacent the volute casing 22, as shown in FIGS. 1 and 4, and secured to the volute casing 22 to maintain the seal arrangement, which is comprised of the seal 20 in sealing engagement between the volute casing 22, the stationary plates 12 and the axially adjustable side plate liner 42. The configuration of the seal 20 enables the seal 20 to be easily installed and removed from the casing elements 32 for repair or replacement. Likewise, because the configuration of the seal 20 does not require chemical bonding or adhesion to maintain the sealing engagement between the volute casing 22, the stationary plates 12 and the axially adjustable side plate liner 42, the configuration of the seal 20 further facilitates ease of repair or replacement of not only the seal 20, but also the volute casing 22, the stationary plates 12 and the axially adjustable side plate liner 42.

In another aspect, assembly of the centrifugal pump 10 includes positioning the retainer member 93 into the groove 94 formed in the axially adjustable side plate liner 42 with the band portion 84 positioned between the volute casing 22 and the axially adjustable side plate liner 42. The stationary plate 12 is arranged to be positioned against the base 76 so that the base 76 is disposed between said stationary plate 12 and at least the volute casing 22.

The seal 20 provides a secure and reliable sealing arrangement that enables a fluid seal to be maintained between the components of the casing irrespective of axial adjustments of the liners 42 that are oftentimes required during the operation of the centrifugal pump 10. Advantageously, the seal 20 is configured to maintain a reliable fluid seal without requiring portions of the seal 20 to be bonded or otherwise glued in place, e.g., to the pump casing 32 or the side plate liner 42.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, inventions have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A seal for a centrifugal pump having a stationary pump casing, a stationary plate and an axially adjustable side liner, the seal comprising:
    a base having an inner surface on a first end of the base, an outer surface on a second and opposed end of the base, and a radial surface extending between the inner and outer surfaces;
    a band portion extending from said base;
    a retainer member extending from said band portion and spaced apart from said base, the retainer member extending from the band portion in a direction away from the second and opposed end of the base oriented for positioning against a groove formed in said axially adjustable side plate liner of said centrifugal pump; and
    a lip positioned proximate said outer surface of said base, the lip extending in a direction substantially parallel to the retainer member.

2. The seal of claim 1, wherein the lip is positioned proximate said outer surface of said base for positioning against a groove formed in said stationary pump casing.

3. The seal of claim 1, wherein said base further comprises an extension member axially extending from said inner surface of said base, wherein a groove is formed between said base and said retainer member.

4. The seal of claim 1 further comprising a rib extending from said band portion in a direction opposite said retainer member and oriented for positioning against said stationary pump casing.

5. The seal of claim 1 further comprising a reinforcing element positioned along said band portion.

6. The seal of claim 5, wherein said reinforcing element is a non-elastic material.

7. The seal of claim 5, wherein said band portion is an elastomer.

8. The seal of claim 7, wherein said band portion comprises a plurality of arcuate segments embedded in said elastomer of said band portion.

9. The seal of claim 5, wherein said reinforcing element is in radial alignment with a rib that is formed in said band portion of said seal.

10. A centrifugal pump comprising:
    a volute casing;
    a suction plate attached to said volute casing and being configured with a suction inlet;
    a frame plate attached to said volute casing and positioned parallel to and spaced apart from said suction plate;
    an axially adjustable suction plate liner positioned adjacent to and adjustably attached to said suction plate;
    an axially adjustable frame plate liner positioned adjacent to and adjustably attached to said frame plate; and
    at least one seal positioned between said suction plate or said frame plate and said volute casing, and between said volute casing and said axially adjustable suction plate liner or said axially adjustable frame plate liner, said at least one seal having a base including an inner surface on a first end of the base and an outer surface on a second and opposed end of the base, and a radial surface extending between the inner and outer surfaces, the base positioned against one of either said suction plate or said frame plate, said at least one seal having a band portion extending from the radial surface at the first end of the base, said band portion having a retainer member spaced apart from said base, the retainer member extending from the band portion in a direction away from the base second end, said band portion being positioned in either a groove in said axially adjustable suction plate liner or a groove in said axially adjustable frame plate liner, and a lip positioned proximate said outer surface of said base, the lip extending in a direction substantially parallel to the retainer member.

11. The centrifugal pump of claim 10, wherein the lip positioned against said volute casing.

12. The centrifugal pump of claim 11, wherein said lip of said at least one seal is positioned in a groove formed in said volute casing.

13. The centrifugal pump of claim 10, wherein said at least one seal further comprises a groove formed between said base and said retainer member to receive a ridge formed in either said axially adjustable suction plate liner or said axially adjustable frame plate liner.

14. The centrifugal pump of claim 10, wherein said at least one seal further comprises a reinforcement element positioned along said band portion of said at least one seal.

15. The centrifugal pump of claim 10, wherein said at least one seal further comprises a rib extending from said band portion in a direction opposite said retainer member to contact said volute casing.

16. The centrifugal pump of claim 10, wherein said at least one seal is a first seal and a second seal, said first seal positioned between said volute casing, said suction plate and said axially adjustable suction plate liner, and said second seal positioned between said volute casing, said frame plate and said axially adjustable frame plate liner.

17. A method of assembling a centrifugal pump having a volute casing, a stationary plate, an axially adjustable plate liner and a seal, said seal having a base having an inner surface on a first end of the base and an outer surface on a second and opposed end of the base, a band portion extending from the radial surface at the base first end, a retainer member extending from said band portion and spaced apart from said base, the retainer member extending from the band portion in a direction away from the base second end, and a lip positioned proximate said outer surface of said base, the lip extending in a direction substantially parallel to the retainer member, the method comprising:
- positioning said retainer member into a groove formed in said axially adjustable plate liner;
- positioning said band portion between said volute casing and said axially adjustable plate liner;
- positioning said stationary plate against said base whereby said base is disposed between said stationary plate and at least said volute casing; and
- securing said stationary plate to said volute casing and said axially adjustable plate liner.

18. The method of claim 17, wherein a ridge is formed on said axially adjustable plate liner and wherein a groove is formed between said base and said retainer member of said seal, the method further comprising the step of positioning said groove over said ridge.

19. A method of adjusting an axially adjustable side plate liner used in a centrifugal pump, the method comprising: engaging a driving member to move said axially adjustable side plate liner in an axial direction relative to said stationary plate while said stationary plate maintains a fixed position, wherein said pump includes a seal, a volute casing, a stationary plate and said axially adjustable side plate liner, said seal having a base including an inner surface on a first end of the base and an outer surface on a second and opposed end of the base, a radial surface extending between the inner and outer surfaces, a band portion extending from said base radial surface at the base first end, a retainer member extending from said band portion spaced apart from said base, the retainer member extending from the band portion in a direction away from the base second end, and a lip positioned proximate said outer surface of said base, the lip extending in a direction substantially parallel to the retainer member, wherein said retainer member is disposed in a groove formed in said axially adjustable side plate liner, said band portion disposed between said volute casing and said axially adjustable side plate liner, and said base disposed between said stationary plate and at least said volute casing such that in response to moving said axially adjustable side plate liner, said seal is elastically deformed.

20. The method of claim 19, wherein said seal deforms as said axially adjustable side plate liner is moved axially relative to said stationary plate to maintain a fluid seal between said volute casing and said axially adjustable side plate liner.

21. The method of claim 19, wherein said retainer member engages said groove when said axially adjustable side plate liner is moved in an axial direction relative to said stationary plate causing the seal to deform to maintain a fluid seal between said volute casing and said axially adjustable side plate liner.

22. The method of claim 19, wherein said seal further comprises a rib extending from said band portion opposite said retainer member, wherein said retainer member engages said groove when said axially adjustable side plate liner is moved in an axial direction relative to said stationary plate, causing said rib to compress against said volute casing to maintain a fluid seal between said volute casing and said axially adjustable side plate liner.

23. The method of claim 22, wherein said seal further comprises a lip positioned proximate an outer surface of said base and extending axially from said base, said lip being retained in a recess formed in said volute casing when said axially adjustable side plate liner is moved in an axial direction relative to said stationary plate to maintain a fluid seal between said volute casing and said stationary plate.

24. A volute casing for use in a centrifugal pump, the centrifugal pump having a stationary plate, an axially adjustable side liner and a seal including a base having an inner surface on a first end of the base and an outer surface on a second and opposed end of the base, a radial surface extending between the inner and outer surfaces, a band portion extending from the radial surface at the base first end, and a retainer member extending from said band portion spaced apart from said base, the retainer member extending from the band portion in a direction away from the base second end, the seal further having a lip positioned proximate the outer surface of the seal and extending from the base, the lip extending in a direction substantially parallel to the retainer member, the volute casing comprising:
- a groove for receiving the lip of the seal therein, wherein the volute casing is oriented toward the stationary plate and the seal is positioned between the volute casing and the stationary plate.

25. The volute casing of claim 24, wherein the groove engages and retains the lip when the seal is deformed due to movement of the axially adjustable side liner.

26. The volute casing of claim 24, wherein the groove extends circumferentially around an outer periphery of the volute casing.

27. An axially adjustable side liner for use in a centrifugal pump, the centrifugal pump having a stationary plate, a volute casing and a seal including a base having an inner surface on a first end of the base and an outer surface on the second and opposed end of the base, a radial surface extending between the inner and outer surfaces, a band portion extending from the radial surface, a retainer member, the retainer member extending from said band portion and spaced apart from said base, the retainer member extending from the band portion in a direction away from the base second end, and a lip positioned proximate the outer surface of the seal and extending from the base, the lip extending in a direction substantially parallel to the retainer member, the axially adjustable side liner comprising:
- a groove extending circumferentially around the side liner for receiving the retainer member therein, wherein the axially adjustable side liner is positioned adjacent the volute casing and the seal is disposed between the axially adjustable side liner and the volute casing.

28. The axially adjustable side liner of claim 27 further comprising a ridge formed in the axially adjustable side liner, the ridge positioned for mating with and receiving a corresponding groove in the seal.

29. The axially adjustable side liner of claim 28, wherein the ridge extends circumferentially around and radially outward from an outer annular surface of the side liner.

30. The axially adjustable side liner of claim 27 further comprising a shoulder formed in the axially adjustable side liner for receiving a complementary portion of the seal.

31. The axially adjustable side liner of claim 30, wherein the shoulder is formed circumferentially around an outer annular surface of the side liner.

32. The axially adjustable side liner of claim 28, wherein the groove in the side liner engages and retains the retainer member when the seal is deformed due to movement of the axially adjustable side liner.

33. The axially adjustable side liner of claim 28, wherein the volute casing groove extends circumferentially around an annular surface of the side liner.

* * * * *